(12) United States Patent
Shinohara et al.

(10) Patent No.: US 12,441,249 B2
(45) Date of Patent: Oct. 14, 2025

(54) IMAGE DISPLAY SYSTEM, IMAGE DISPLAY METHOD, AND IMAGE DISPLAY DEVICE

(71) Applicant: NEC Corporation, Tokyo (JP)

(72) Inventors: Yusuke Shinohara, Tokyo (JP); Takanori Iwai, Tokyo (JP); Hayato Itsumi, Tokyo (JP); Kosei Kobayashi, Tokyo (JP); Kazuki Ogata, Tokyo (JP); Koichi Nihei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/709,083

(22) PCT Filed: Nov. 22, 2021

(86) PCT No.: PCT/JP2021/042811
§ 371 (c)(1),
(2) Date: May 10, 2024

(87) PCT Pub. No.: WO2023/089834
PCT Pub. Date: May 25, 2023

(65) Prior Publication Data
US 2025/0001940 A1  Jan. 2, 2025

(51) Int. Cl.
*B60R 1/24* (2022.01)
*G06T 3/20* (2006.01)
(Continued)

(52) U.S. Cl.
CPC ............... *B60R 1/24* (2022.01); *G06T 3/20* (2013.01); *G06T 7/20* (2013.01); *G06V 20/54* (2022.01);
(Continued)

(58) Field of Classification Search
CPC ... B60R 1/24; B60R 2300/10; B60R 2300/20; B60R 2300/307; G06T 3/20; G06T 7/20;
(Continued)

(56) References Cited

U.S. PATENT DOCUMENTS 10,255,705 B2\* 4/2019 McCullough ........... G06T 11/60
11,939,746 B2\* 3/2024 Kiyota .................... H04N 5/272
(Continued)

FOREIGN PATENT DOCUMENTS

JP 2001-101566 A 4/2001
JP 2008-046744 A 2/2008
(Continued)

OTHER PUBLICATIONS

International Search Report for PCT Application No. PCT/JP2021/042811, mailed on Feb. 1, 2022.
(Continued)

*Primary Examiner* — James M Pontius
(74) *Attorney, Agent, or Firm* — Sughrue Mion, PLLC

(57) ABSTRACT

In order to make it possible to correct an object position so as to reduce a deviation in position of a detected object, a video display system (100) includes: a detection section (11) for detecting an object from a first video; a time interval estimation section (12) for estimating a time interval from when the first video is taken to when the object which has been detected by the detection section (11) is superimposed on a second video; and a first position correction section (13) for correcting a position of the object in the second video based on a moving speed of an imaging apparatus that takes the second video and the time interval which has been estimated by the time interval estimation section (12).

20 Claims, 11 Drawing Sheets

(51) Int. Cl.
   *G06T 7/20* (2017.01)
   *G06V 20/54* (2022.01)
   *G06V 10/82* (2022.01)

(52) U.S. Cl.
   CPC ....... *B60R 2300/10* (2013.01); *B60R 2300/20* (2013.01); *B60R 2300/307* (2013.01); *G06T 2207/10016* (2013.01); *G06T 2207/20084* (2013.01); *G06T 2207/20212* (2013.01); *G06T 2207/30236* (2013.01); *G06V 10/82* (2022.01)

(58) Field of Classification Search
   CPC . G06T 2207/10016; G06T 2207/20084; G06T 2207/20212; G06T 2207/30236; G06V 20/54; G06V 10/82; B60K 35/10; B60K 35/22; B60K 35/28; B60K 35/50; B60K 35/60; B60K 35/90
   See application file for complete search history.

(56) References Cited

U.S. PATENT DOCUMENTS

| | | | | |
|---|---|---|---|---|
| 2018/0040151 | A1* | 2/2018 | McCullough | G02B 27/0172 |
| 2019/0322222 | A1 | 10/2019 | Kondou et al. | |
| 2019/0356897 | A1* | 11/2019 | Karivaradaswamy | H04N 13/139 |
| 2024/0037385 | A1* | 2/2024 | Torabi | G16H 50/20 |
| 2024/0037945 | A1* | 2/2024 | Torabi | G16H 50/70 |
| 2025/0080809 | A1* | 3/2025 | Yan | H04N 21/2187 |

FOREIGN PATENT DOCUMENTS

| | | |
|---|---|---|
| JP | 2008-167348 A | 7/2008 |
| JP | 2010-245859 A | 10/2010 |
| JP | 2014-229100 A | 12/2014 |
| JP | 2021-029037 A | 2/2021 |
| WO | 2012/131871 A1 | 10/2012 |
| WO | 2018/116588 A1 | 6/2018 |
| WO | 2018/193708 A1 | 10/2018 |
| WO | 2019/159344 A1 | 8/2019 |

OTHER PUBLICATIONS

JP Office Action for JP Application No. 2023-562101, mailed on Jun. 3, 2025 with English Translation.

* cited by examiner

IMAGE DISPLAY SYSTEM, IMAGE DISPLAY METHOD, AND IMAGE DISPLAY DEVICE

This application is a National Stage Entry of PCT/JP2021/042811 filed on Nov. 22, 2021, the contents of all of which are incorporated herein by reference, in their entirety.

TECHNICAL FIELD

The present invention relates to a video display system, a video display method, and a video display apparatus.

BACKGROUND ART

Conventionally, a system has been proposed in which a plurality of videos are collected from remote locations, and are integrated with a camera video to ascertain a situation of a moving object, and such an integrated video can be utilized in operation of a vehicle or the like. As related technologies, there are inventions disclosed in Patent Literatures 1 and 2 below.

Patent Literature 1 discloses an operation support apparatus including an object position prediction section. The object position prediction section sets a recognition delay time in accordance with a time taken for an object position recognition section to recognize a position of an object, and determines a predicted position of the object after the recognition delay time.

Patent Literature 2 discloses a head-up display apparatus that displays a virtual image superimposed on a sight in front of a vehicle. The head-up display apparatus carries out a conversion process so as to align a display position of an image in a display area with a position of an object in a case where the object is viewed through a viewing area from a basic setting which is a viewpoint position of an operator.

CITATION LIST

Patent Literature

[Patent Literature 1]
International Publication No. WO2019/159344
[Patent Literature 2]
International Publication No. WO2018/193708

SUMMARY OF INVENTION

Technical Problem

In a case where information acquired from another apparatus is superimposed on a video taken by an in-vehicle camera mounted on a vehicle, a camera video changes at high speed in accordance with high-speed movement of the vehicle. Therefore, if an information transfer delay, an analysis process delay, or the like occurs in that another apparatus, there is a possibility that a deviation occurs in information superimposed on a video taken by the in-vehicle camera that moves at high speed.

The operation support apparatus disclosed in Patent Literature 1 determines a predicted position of the object after the recognition delay time. However, no consideration is given to a communication delay or the like caused in exchange of information via a network. Therefore, there is a possibility that a deviation in information greater than intended occurs.

In the head-up display apparatus disclosed in Patent Literature 2, the position of the object in a case where the object is viewed through the viewing area from the viewpoint position of the operator is aligned with the display position of the image in the display area. Thus, the operator is in the same vehicle as the camera. Therefore, for example, it is not taken into consideration to integrate a camera video with information of an object that moves in a different manner.

An example aspect of the present invention is accomplished in view of the above problem, and an example object thereof is to provide a technique which makes it possible, when displaying an image, to correct an object position so that a deviation in position of a detected object is reduced.

Solution to Problem

A video display system in accordance with an example aspect of the present invention includes at least one processor, the at least one processor carrying out: a process of detecting an object from a first video; a process of estimating a time interval from when the first video is taken to when the object which has been detected is superimposed on a second video; and a process of correcting a position of the object in the second video based on a moving speed of an imaging apparatus that takes the second video and the time interval which has been estimated.

A video display method in accordance with an example aspect of the present invention includes: detecting an object from a first video; estimating a time interval from when the first video is taken to when the object which has been detected is superimposed on a second video; and correcting a position of the object in the second video based on a moving speed of an imaging apparatus that takes the second video and the time interval.

A video display apparatus in accordance with an example aspect of the present invention includes at least one processor, the at least one processor carrying out: a process of detecting an object from a first video; a process of estimating a time interval from when the first video is taken to when the object which has been detected is superimposed on a second video; and a process of correcting a position of the object in the second video based on a moving speed of an imaging apparatus that takes the second video and the time interval which has been estimated.

Advantageous Effects of Invention

According to an example aspect of the present invention, it is possible, when displaying an image, to correct an object position so that a deviation in position of a detected object is reduced.

EXAMPLE EMBODIMENTS

First Example Embodiment

The following description will discuss a first example embodiment of the present invention in detail, with reference to the drawings. The present example embodiment is a basic form of example embodiments described later.

Overview of Video Display System 100

Schematically speaking, a video display system 100 in accordance with the present example embodiment estimates a time interval from when a first video is taken to when an object which has been detected is superimposed on a second video, and corrects a position of the object in the second video in accordance with the time interval.

Configuration of Video Display System 100

Figure 1:
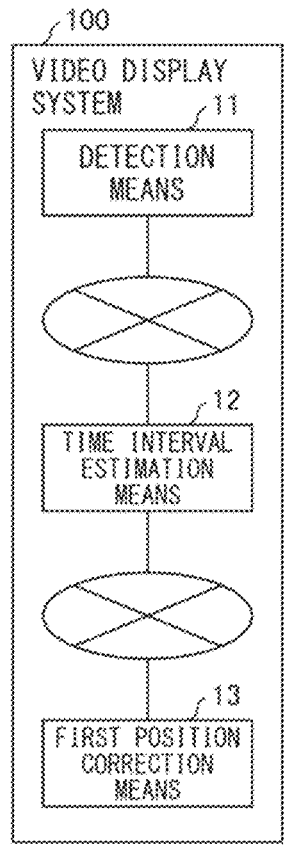
FIG. 1 is a block diagram illustrating a functional configuration of a video display system in accordance with a first example embodiment of the present invention.

The following description will discuss a configuration of the video display system 100 in accordance with the present example embodiment, with reference to FIG. 1. FIG. 1 is a block diagram illustrating the configuration of the video display system 100.

As illustrated in FIG. 1, the video display system 100 includes a detection means 11, a time interval estimation means 12, and a first position correction means 13. The detection means 11, the time interval estimation means 12, and the first position correction means 13 may be connected to each other via a communication network.

The detection means 11 detects an object from a first video. For example, the detection means 11 carries out an analysis process of inputting a first video from a camera that is provided in a traffic light, and analyzing the first video to detect an object included in the first video. The detection means 11 outputs position information, size information, shape information, a type, and the like of the object which has been detected. The object to be detected is mainly an automobile, a pedestrian, an obstacle such as a building, and the like.

The detection means 11 can carry out object detection using, for example, a regional convolutional neural network (R-CNN). The detection section 11 inputs a first video from a camera that is provided in a traffic light, and acquires an image for one frame included in the first video. Then, the detection means 11 extracts, from the acquired image, candidate regions (region proposal) in which an object appears. The image can be a still image or a moving image.

Next, the detection means 11 calculates feature quantities of the respective candidate regions using the CNN. Then, the detection means 11 classifies matters appearing in the respective regions. Thus, it is possible to carry out high-precision object detection by using the R-CNN. However, it takes a lot of time because it is necessary to extract feature quantities of approximately 2,000 candidate regions. In recent years, Fast R-CNN, Faster R-CNN, You Only Look Once (YOLO), and the like have been developed, and object detection in real time can be carried out.

The time interval estimation means 12 estimates a time interval from when the first video is taken to when the object which has been detected by the detection means 11 is superimposed on a second video. For example, in a case where time synchronization is achieved between a camera that takes a first video and the detection means 11, the camera outputs a first video with time information. The time interval estimation means 12 estimates a time interval from the time information given to the first video and time information indicating a time at which the object is superimposed on a second video.

For example, the time interval may include a delay time from when the first video is taken by the camera to when the first video is acquired by the detection means 11. The time interval may include a delay time that is taken for the detection means 11 to detect the object.

Here, the delay time is a time of a delay that is generated by a certain process. For example, the delay time due to the object detection described above is a time from when the detection of the object appearing in the first video is started to when the detection of the object appearing in the first video is completed.

Note that the delay time is also a processing time that is taken to carry out a predetermined process. The time interval may be obtained by adding a delay time, or may be obtained by adding a delay time and a processing time. Alternatively, the time interval may be obtained by adding a delay time and/or a processing time and then subtracting another delay time and/or another processing time.

The time interval may include a delay time from when detection of the object by the detection means 11 is ended to when the object is superimposed on a second video. The time interval may include a delay time from when a second video is taken by an imaging apparatus to when the second video is acquired by the video display system 100.

The first position correction means 13 corrects a position of the object in the second video based on a moving speed of the imaging apparatus that takes the second video and the time interval which has been estimated by the time interval estimation means 12.

The imaging apparatus that takes a second video is, for example, an in-vehicle camera or the like mounted on a vehicle. A moving speed of the imaging apparatus is the same as that of the vehicle. The moving speed of the vehicle can be acquired, for example, by using a vehicle to everything (V2X) communication technique.

Examples of data exchanged by the V2X communication technique include road traffic information, data pertaining to a behavior of an automobile, data pertaining to formation and follow-up travelling, and data pertaining to automatic driving. Among these pieces of data, it is possible to utilize data pertaining to a behavior of an automobile, in particular, information on a travelling area, a travelling speed, and a travelling distance of the automobile, driving characteristics (such as acceleration and deceleration and steering), a status of the automobile, and the like.

The first position correction means 13 multiplies the moving speed of the imaging apparatus by the time interval which has been estimated by the time interval estimation means 12. Thus, the first position correction means 13 calculates a distance in which the imaging apparatus moves from when the first video is taken to when the object which has been detected by the detection means 11 is superimposed on a second video. The first position correction means 13 then corrects a position and/or a size of the object based on information (such as position information, size information, and shape information) of the object which has been detected by the detection means 11 and the moving distance of the imaging apparatus. For example, the first position correction means 13 corrects a position and a size of the object so that the object approaches the imaging apparatus by an amount corresponding to the moving distance of the imaging apparatus.

For example, in a case where an object detected in a first video by the detection means 11 is superimposed on a second video at an original position (i.e., a position at which the object has been detected in the first video), a time that has been taken for object detection or the like is not taken into consideration. Therefore, it is impossible to carry out superimposition and display at a correct position (i.e., a position where the object exists in a real space). The first position correction means 13 corrects a position of the object in the second video so that the object is at the correct position (i.e., a position where the object exists in the real space) in the second video while taking into consideration the time taken for object detection or the like. Correcting a position and a size of an object means that correction is carried out so that the position and the size of the object in a second video become a correct position (i.e., a position where the object exists in the real space) and a correct size (i.e., a size of the object in the real space), respectively.

For example, in a case where a second video taken by the imaging apparatus is displayed on a display apparatus, in the second video, an object whose position and size have been corrected by the first position correction means 13 is displayed.

The functions of the video display system 100 may be implemented on a cloud. For example, the detection section 11 may constitute a single apparatus, and the time interval estimation section 12 and the first position correction section 13 may constitute a single apparatus. These components may be provided in a single apparatus or may be provided in separate apparatuses. For example, in a case where the components are provided in separate apparatuses, pieces of information of the components are transmitted and received via a communication network, and thus processing is advanced.

Example Advantage of Video Display System 100

As described above, according to the video display system 100 in accordance with the present example embodiment, the first position correction section 13 corrects a position of an object in a second video based on a moving speed of an imaging apparatus that takes the second video and a time interval which has been estimated by the time interval estimation section 12. Therefore, it is possible to correct an object position so that a deviation in position of a detected object is reduced.

In a system which is operated by collecting videos from a plurality of cameras, it is possible to reduce a deviation in position of an object or the like when an object appearing in another camera is superimposed and displayed on a camera video. For example, in a case where a person who appears in a video taken by a camera that is provided at an intersection is superimposed on a video taken by a camera that is mounted on a vehicle, it is possible to correct an object position so that a deviation between a position where the person has been detected and a position of the person in the video taken by the camera mounted on the vehicle is reduced. Even in a case where there is an object which does not appear in a second video taken by the imaging apparatus (e.g., there is an object which does not appear in an in-vehicle camera mounted on a vehicle), it is possible to superimpose and display such an object which is not seen in the second video on the second video by complementing a blind spot by a plurality of cameras. For example, in a case where a camera provided at an intersection indicates that there is a person standing near a truck that is stopped on a road (i.e., at a position where the person cannot be seen from a vehicle), an object position is corrected so that a deviation between a position where the person has been detected and a position of the person in the video taken by a camera mounted on the vehicle is reduced when the person is superimposed on the video taken by the camera mounted on the vehicle. This allows a person (or may be a system, AI, or the like for achieving a collision detection function or autonomous driving) that has viewed the video taken by the in-vehicle camera to recognize the person.

<Flow of Video Display Method Carried Out by Video Display System 100>

Figure 2:
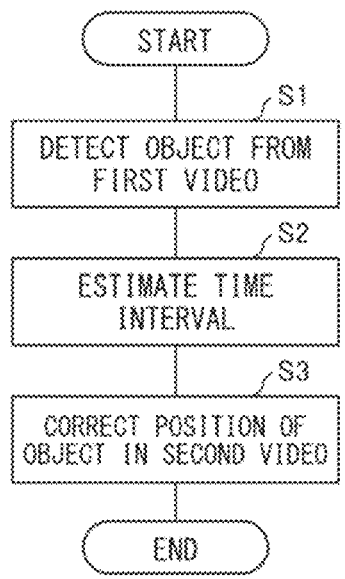
FIG. 2 is a flowchart illustrating a flow of a video display method in accordance with the first example embodiment of the present invention.

The following description will discuss a flow of a video display method which is carried out by the video display system 100 configured as described above, with reference to FIG. 2. FIG. 2 is a flowchart illustrating the flow of the video display method. As illustrated in FIG. 2, the video display method includes steps S1 through S3.

First, the detection means 11 detects an object from a first video (S1). Then, the time interval estimation means 12 estimates a time interval from when the first video is taken to when the object which has been detected is superimposed on a second video (S2). Lastly, the first position correction means 13 corrects a position of the object in the second video based on a moving speed of an imaging apparatus that takes the second video and the time interval (S3).

Example Advantage of Video Display Method

As described above, according to the video display method in accordance with the present example embodiment, in step S3, the position of the object in the second video is corrected based on the moving speed of the imaging apparatus that takes the second video and the time interval. Therefore, it is possible to correct the object position so that a deviation in position of the detected object is reduced.

<Configuration of Video Display Apparatus 1>

Figure 3:
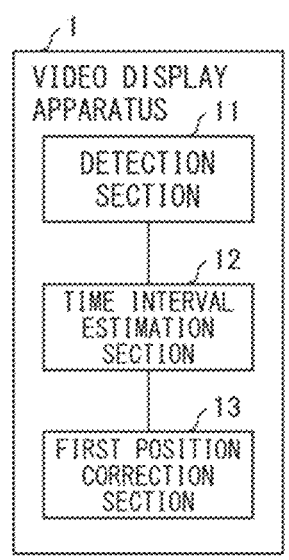
FIG. 3 is a block diagram illustrating a functional configuration of a video display apparatus in accordance with the first example embodiment of the present invention.

The following description will discuss a configuration of a video display apparatus 1 in accordance with the present example embodiment, with reference to FIG. 3. FIG. 3 is a block diagram illustrating a functional configuration of the video display apparatus 1. As illustrated in FIG. 3, the video display apparatus 1 includes a detection section 11, a time interval estimation section 12, and a first position correction section 13.

The detection section 11 is configured to implement the detection means in the present example embodiment. The time interval estimation section 12 is configured to implement the time interval estimation means in the present example embodiment. The first position correction section 13 is configured to implement the first position correction means in the present example embodiment.

The detection section 11 detects an object from a first video. For example, the detection section 11 carries out an analysis process of inputting a first video from a camera that is provided in a traffic light, and analyzing the first video to detect an object included in the first video. The detection section 11 outputs position information of the object detected in the first video, size information and shape information of the object in the first video, a type of the object, and the like. For example, the shape information of the object may be information in which the object is cut out in a rectangle, or may be information in which the object is cut out along a contour of the object.

The time interval estimation section 12 estimates a time interval from when the first video is taken to when the object which has been detected by the detection section 11 is superimposed on a second video. For example, in a case where time synchronization is achieved between a camera that takes a first video and the detection section 11, the camera outputs a first video with time information. The time interval estimation section 12 estimates a time interval from the time information given to the first video and time information indicating a time at which the object is superimposed on a second video. As the time until the object is superimposed on the second video, it is possible to use a time which has been taken in a similar superimposition process immediately before.

The first position correction section 13 corrects a position of the object in the second video based on a moving speed of an imaging apparatus that takes the second video and the time interval which has been estimated by the time interval estimation section 12. Specifically, the first position correction section 13 calculates a moving distance by multiplying the moving speed of the imaging apparatus that takes the second video by the time interval which has been estimated by the time interval estimation section 12, and corrects, in accordance with the moving distance, a deviation in position of the object which has been detected by the detection section 11.

Example Advantage of Video Display Apparatus 1

As described above, according to the video display apparatus 1 in accordance with the present example embodiment, the first position correction section 13 corrects a position of the object in the second video based on a moving speed of an imaging apparatus that takes the second video and the time interval which has been estimated by the time interval estimation section 12. Therefore, it is possible to correct an object position so that a deviation in position of a detected object is reduced.

Second Example Embodiment

Figure 4:
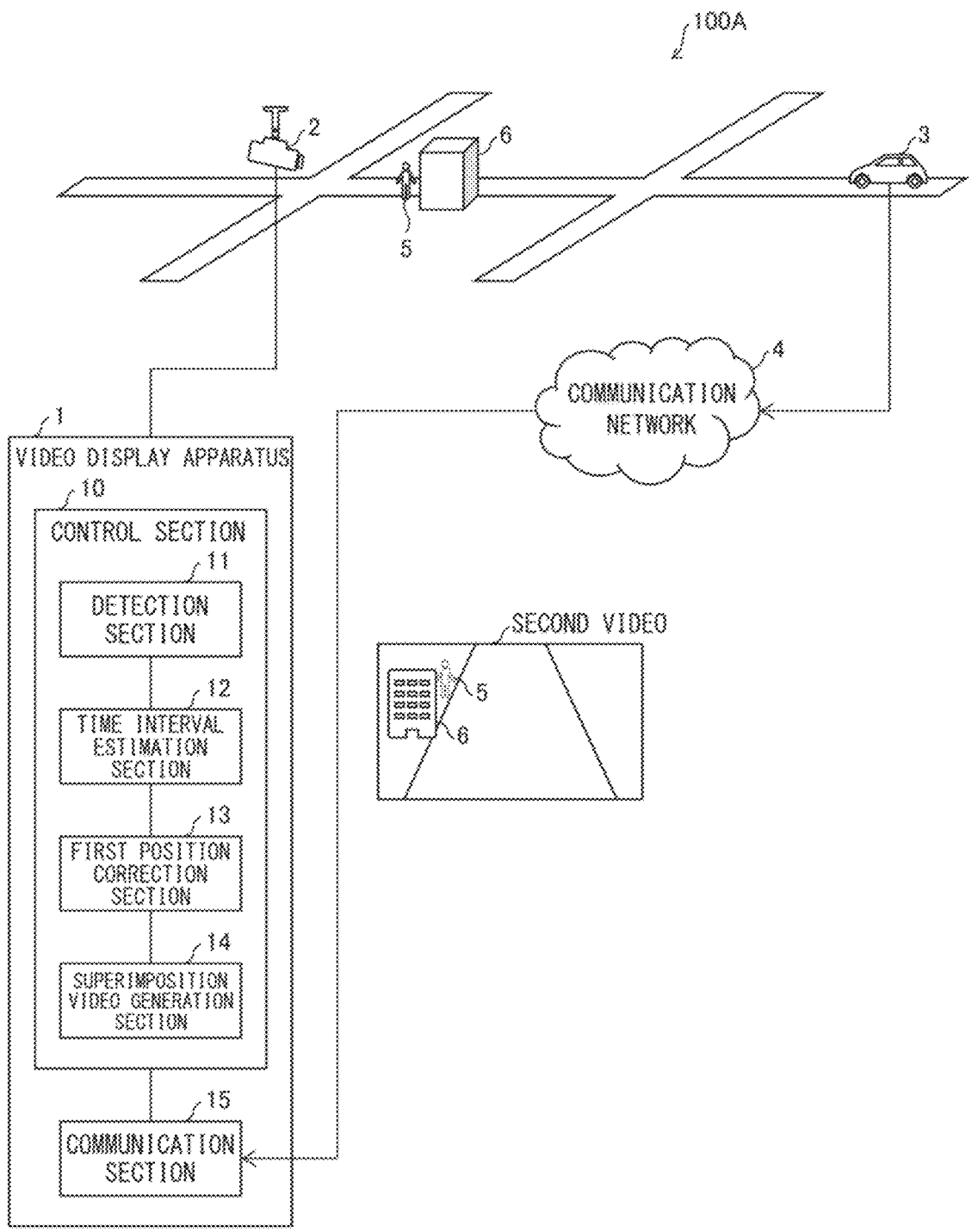
FIG. 4 is a block diagram illustrating a functional configuration of a video display system in accordance with a second example embodiment of the present invention.

The following description will discuss a second example embodiment of the present invention in detail with reference to the drawings. FIG. 4 is a block diagram illustrating a functional configuration of the video display system 100A. A video display apparatus 1A in accordance with the present example embodiment is provided in, for example, a control center or the like. A camera 2 that takes a first video is provided in, for example, a traffic light. An in-vehicle camera that takes a second video is mounted on, for example, a vehicle 3. The in-vehicle camera is an example of the imaging apparatus that takes a second video.

<Configuration of Video Display System 100A>

The following description will discuss a configuration of the video display system 100A in accordance with the present example embodiment, with reference to FIG. 4. As illustrated in FIG. 4, the video display system 100A includes the video display apparatus 1A, the camera 2 that takes a first video, and the in-vehicle camera that is mounted on the vehicle 3 and takes a second video.

The video display apparatus 1A includes a control section 10 and a communication section 15. The control section 10 includes a detection section 11, a time interval estimation section 12, a first position correction section 13, and a superimposition video generation section 14. The same reference numerals are given to constituent elements which have functions identical with those described in the first and second example embodiments, and descriptions as to such constituent elements are omitted as appropriate.

The detection section 11 is configured to implement the detection means in the present example embodiment. The time interval estimation section 12 is configured to implement the time interval estimation means in the present example embodiment. The first position correction section 13 is configured to implement the first position correction means in the present example embodiment. The superimposition video generation section 14 is configured to implement the superimposition video generation means in the present example embodiment.

The detection section 11 detects an object from a first video received from the camera 2 via the communication section 15. For example, the detection section 11 carries out an analysis process of inputting a first video from the camera 2 that is provided in a traffic light, and analyzing the first video to detect an object included in the first video. The detection section 11 outputs position information, size information, shape information, a type, and the like of the object which has been detected.

The time interval estimation section 12 estimates a time interval from when the first video is taken to when the object which has been detected by the detection section 11 is superimposed on a second video. The time interval includes a first delay time from when the first video is taken to when the first video is acquired by the detection section 11. For example, in a case where time synchronization is achieved between the camera 2 that takes a first video and the detection section 11, the camera 2 transmits a first video with time information. The time interval estimation section 12 estimates a first delay time based on the time information given to the first video and the time information indicating a time at which the detection section 11 has input the first video.

In a case where time synchronization is not achieved between the camera 2 that takes a first video and the detection section 11, for example, (i) it is possible to employ a configuration in which the camera 2 or the detection section 11 transmits a packet for time measurement so as to calculate a first delay time, (ii) it is possible to use a preset time, or (iii) it is possible to employ a configuration in which a relationship between a status (place, time, weather, car type, date of manufacture of a communication apparatus, and the like) and delay information is set in advance, and the relationship is used.

The time interval also includes a second delay time that is taken for the detection section 11 to detect the object. The time interval estimation section 12 can measure, for example, an analysis process start time and an analysis process end time of an analysis process carried out by the detection section 11, and can set a time obtained by subtracting the analysis process start time from the analysis process end time as a second delay time.

The first position correction section 13 corrects a position of the object in the second video based on a moving speed of an imaging apparatus that takes the second video and the time interval which has been estimated by the time interval estimation section 12. Specifically, the first position correction section 13 calculates a moving distance by multiplying the moving speed of the imaging apparatus that takes the second video by the time interval which has been estimated by the time interval estimation section 12, and corrects, in accordance with the moving distance, a deviation in position of the object which has been detected by the detection section 11.

The detection section 11 detects an object from a first video. For example, the detection section 11 carries out an analysis process of inputting a first video from a camera that is provided in a traffic light, and analyzing the first video to detect an object included in the first video. The detection section 11 outputs position information of the object detected in the first video, size information and shape information of the object in the first video, a type of the object, and the like. For example, the shape information of the object may be information in which the object is cut out in a rectangle, or may be information in which the object is cut out along a contour of the object.

The superimposition video generation section 14 superimposes, on a second video, an object whose position has been corrected by the first position correction section 13. The superimposition video generation section 14 may superimpose and display, on a second video, an object whose position has been corrected. The superimposition video generation section 14 receives, via the communication section 15, a second video from the in-vehicle camera mounted on the vehicle 3, and superimposes, on the received second video, an object whose position has been corrected.

For example, in a case where a second video taken by the imaging apparatus is displayed on a display apparatus, in the second video, an object whose position and size have been corrected by the first position correction means 13 is displayed.

The time interval includes a third delay time from when detection of the object by the detection section 11 is ended to when the superimposition video generation section 14 carries out superimposition of the object. The time interval estimation section 12 can calculate the third delay time based on time information indicating a time at which detection of the object by the detection section 11 is ended and time information indicating a time at which superimposition of the object on the second video by the superimposition video generation section 14 is ended. As the time until the object is superimposed on the second video, it is possible to use a time which has been taken in a similar superimposition process immediately before. For example, the time interval estimation section 12 may calculate, in immediately preceding operation, a third delay time based on the time information indicating a time at which detection of the object by the detection section 11 is ended and time information indicating a time at which superimposition of the object on a second video by the superimposition video generation section 14 is ended, and estimate a third delay time in the current operation.

The time interval includes a fourth delay time from when a second video is taken to when the second video is acquired. For example, in a case where time synchronization is achieved between the in-vehicle camera that takes a second video and the video display apparatus 1A, the in-vehicle camera gives time information to a second video and transmits the second video with the time information to the video display apparatus 1A. The time interval estimation section 12 estimates a fourth delay time based on the time information given to the second video and time information indicating a time at which the superimposition video generation section 14 has superimposed the object on the second video.

As illustrated in FIG. 4, the video display apparatus 1A receives, via a communication network 4, the second video from the in-vehicle camera mounted on the vehicle 3. The detection section 11 inputs a first video that has been taken by the camera 2 and detects a passer-by 5 and a building 6.

The time interval estimation section 12 estimates a time interval based on the first delay time, the second delay time, and the third delay time, and outputs the estimated time interval to the first position correction section 13. The first position correction section 13 corrects positions of the passer-by 5 and the building 6 based on a moving speed of the in-vehicle camera that takes a second video and the time interval which has been estimated by the time interval estimation section 12.

As illustrated in FIG. 4, the superimposition video generation section 14 superimposes, on the second video, the passer-by 5 and the building 6 whose positions have been corrected. The superimposition video generation section 14 may superimpose and display, on the second video, the passer-by 5 and the building 6 whose positions have been corrected.

Figure 5:
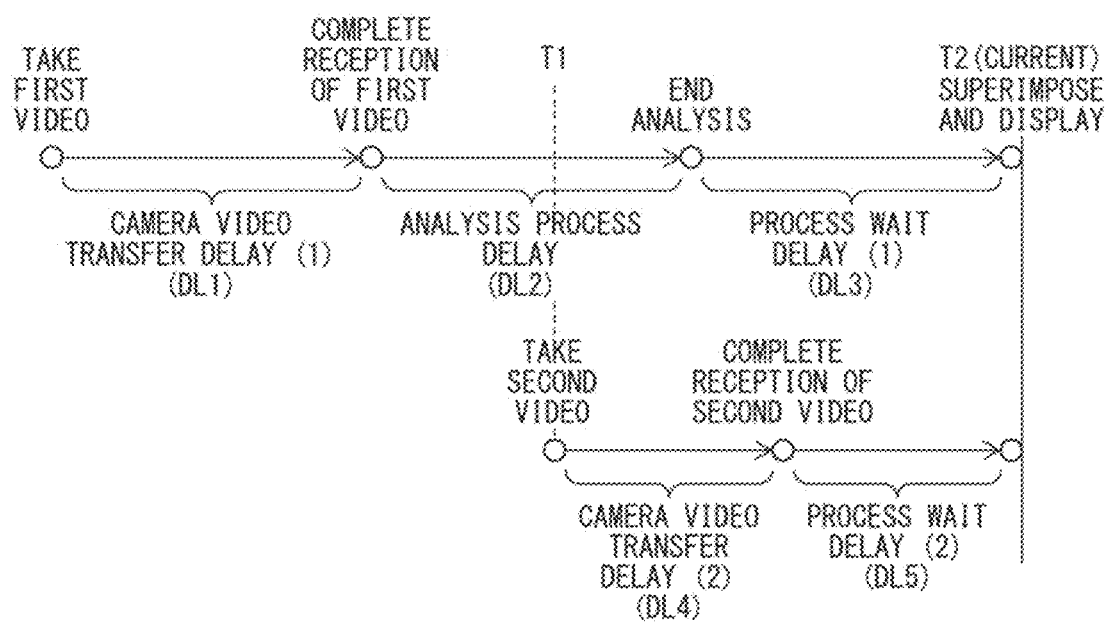
FIG. 5 is a diagram for describing a time interval estimated by a time interval estimation section.

FIG. 5 is a diagram for describing a time interval estimated by the time interval estimation section 12. In a case where a first video taken by the camera 2 is received by the video display apparatus 1A via the communication network 4, as illustrated in FIG. 5, a camera video transfer delay (1) (DL1) is a delay time from when the first video is taken by the camera 2 to when reception of the first video by the communication section 15 of the video display apparatus 1A is completed. The camera video transfer delay (1) (DL1) corresponds to the first delay time.

An analysis process delay (DL2) is a delay time from when reception of the first video by the communication section 15 of the video display apparatus 1A is completed to when analysis of the object by the detection section 11 is ended. The analysis process delay (DL2) corresponds to the second delay time.

The process wait delay (1) (DL3) is a delay time from when analysis of the object by the detection section 11 is ended to when the object is superimposed (or superimposed and displayed) on the second video by the superimposition video generation section 14. The process wait delay (1) (DL3) corresponds to the third delay time.

For example, superimposing an object on a video indicates that an object whose position and size have been corrected by the first position correction section 13 is superimposed on a second video taken by the in-vehicle camera. Superimposing and displaying an object indicates that, when a second video taken by the in-vehicle camera is displayed on a display apparatus, the second video on which an object whose position and size have been corrected by the first position correction section 13 is superimposed is displayed. In the above description, it has been described that a video is superimposed. However, operation of the superimposition video generation section 14 is not limited to operation of superimposing a video (or an image of an object) on a video, provided that a video displayed seems to be a superimposed video. For example, the superimposition video generation section 14 may display a second video taken by the in-vehicle camera in which a part of a first video or a video (or image) of an object overlaps the second video. For example, the superimposition video generation section 14 may display a single video obtained by combining a second video taken by the in-vehicle camera with a part of a first video or a video (or image) of an object.

A camera video transfer delay (2) (DL4) is a delay time from when a second video is taken by the in-vehicle camera to when reception of the second video by the communication section 15 of the video display apparatus 1A is completed. The camera video transfer delay (2) (DL4) corresponds to the fourth delay time.

A process wait delay (2) (DL5) is a delay time from when reception of the second video by the communication section 15 of the video display apparatus 1A is completed to when the object is superimposed (or superimposed and displayed) on the second video by the superimposition video generation section 14.

In a case where an object which has been detected by the detection section 11 is superimposed or superimposed and displayed on a second video taken at a timing T1 in FIG. 5, the moving distance of the in-vehicle camera mounted on the vehicle 3 is as indicated in an expression (expression 1) below. As such, the first position correction section 13 corrects, in accordance with the moving distance of the in-vehicle camera, a position of the object which has been detected by the detection section 11.

Moving distance of in-vehicle camera = (DL1 + DL2 + DL3 − DL4 − DL5) × (moving speed of in-vechicle camera)  (expression 1)

In the above descriptions, the case has been described in which the superimposition video generation section is provided in the control center. Note, however, that it is possible to employ a configuration in which the in-vehicle camera mounted on the vehicle 3 includes the superimposition video generation section, and an object is superimposed on a second video on the in-vehicle camera side. In this case, the video display apparatus 1A transmits position information or the like of the object which has been corrected by the first position correction section 13 to the in-vehicle camera via the communication network 4. The superimposition video generation section of the in-vehicle camera superimposes the corrected object received from the video display apparatus 1A on a second video that has been taken by the in-vehicle camera. As illustrated in FIG. 5, the in-vehicle camera superimposes the object on the second video at a timing T2. Therefore, the moving distance of the in-vehicle camera mounted on the vehicle 3 is as indicated in an expression (expression 2) below. Note that it is possible to place a function as a video processing apparatus on a cloud side and provide a superimposed video as a result to the control center or the vehicle.

Moving distance of in-vehicle camera = (DL1 + DL2 + DL3) × (moving speed of in-vechicle camera)  (expression 2)

The first position correction section 13 corrects a position of the object which has been detected by the detection section 11 in accordance with the moving distance of the in-vehicle camera which has been calculated using (expression 1) or (expression 2). Note that a delay time which is taken from when the video display apparatus 1A transmits position information and the like of the corrected object to the in-vehicle camera and to when the in-vehicle camera receives the information is very short. Therefore, such a delay time does not need to be taken into consideration, or the delay time may be included in DL3.

Figure 6:
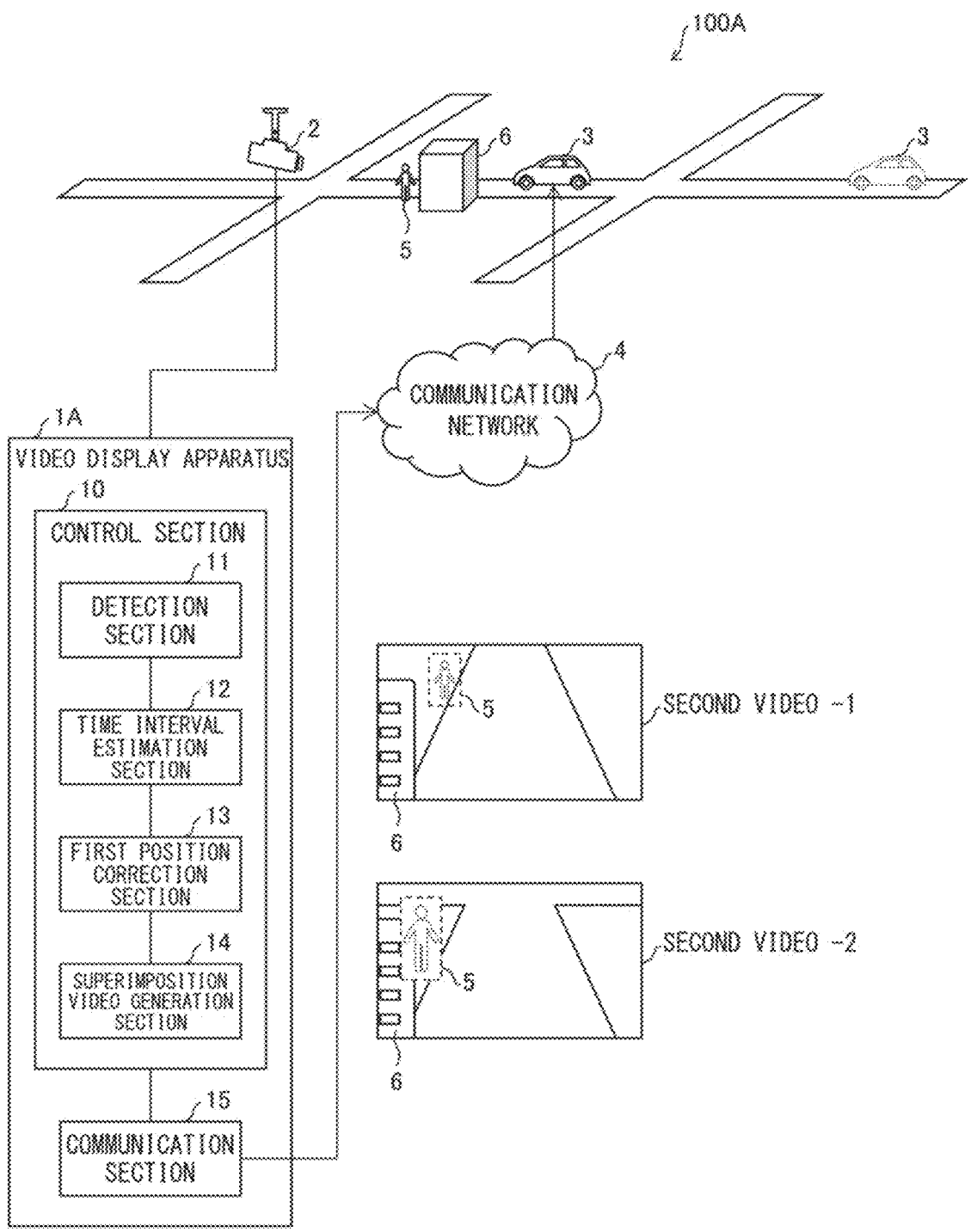
FIG. 6 is a diagram for describing a second video in a case where a time interval estimated by the time interval estimation section is taken into consideration.

FIG. 6 is a diagram for describing a second video in a case where a time interval estimated by the time interval estimation section 12 is taken into consideration. It is assumed that the vehicle 3 has moved from a position indicated by dotted lines to a position indicated by solid lines during the time interval which has been estimated by the time interval estimation section 12.

A second video −1 indicates a case in which the time interval which has been estimated by the time interval estimation section 12 is not taken into consideration. A second video −2 indicates a case in which the time interval which has been estimated by the time interval estimation section 12 is taken into consideration. The vehicle 3 approaches the passer-by 5 by the moving distance of the vehicle 3. Therefore, as indicated in the second video −2, the first position correction section 13 carries out correction such that the position of the passer-by 5 in the second video approaches the vehicle 3, and carries out correction such that the passer-by 5 becomes larger accordingly. In FIG. 6, the passer-by 5 displayed is surrounded with a dotted line so that the passer-by 5 stands out. Alternatively, for example, the passer-by 5 displayed may be highlighted.

Flow of Video Display Method Carried Out by Video Display System 100A

Figure 7:
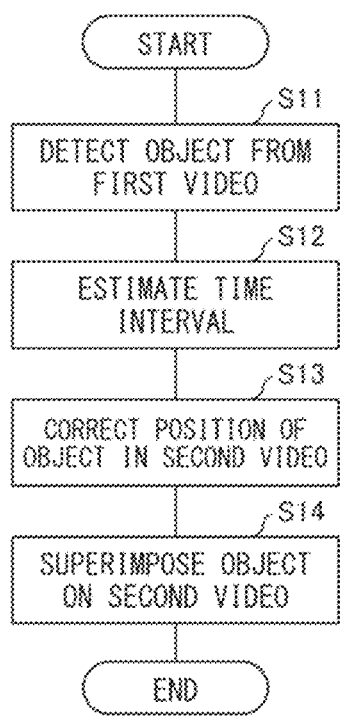
FIG. 7 is a flowchart illustrating a flow of a video display method in accordance with the second example embodiment of the present invention.

The following description will discuss a flow of a video display method which is carried out by the video display system 100A configured as described above, with reference to FIG. 7. FIG. 7 is a flowchart illustrating the flow of the video display method. As illustrated in FIG. 7, the video display method includes steps S11 through S14.

First, the detection section 11 detects an object from a first video (S11). Then, the time interval estimation section 12 estimates a time interval from when the first video is taken to when the object which has been detected is superimposed on a second video (S12).

The first position correction section 13 corrects a position of the object in the second video based on a moving speed of an imaging apparatus that takes the second video and the time interval (S13). Lastly, the superimposition video generation section 14 superimposes, on the second video, the object whose position has been corrected (S14).

Example Advantage of Video Display System 100A

As described above, according to the video display system 100A in accordance with the present example embodiment, the first position correction section 13 corrects a position of the object in the second video based on a moving speed of an imaging apparatus that takes the second video and the time interval which has been estimated by the time interval estimation section 12. Therefore, the first position correction section 13 can correct the object position so that a deviation in position of the detected object is reduced.

The time interval estimated by the time interval estimation section 12 includes the first delay time from when the first video is taken to when the first video is acquired by the detection section 11. Therefore, the first position correction section 13 can correct the object position so that a deviation in position of the detected object is further reduced.

The time interval estimated by the time interval estimation section 12 includes the second delay time that is taken for the detection section 11 to detect the object. Therefore, the first position correction section 13 can correct the object position so that a deviation in position of the detected object is further reduced.

The superimposition video generation section 14 superimposes, on the second video, the object whose position has been corrected by the first position correction section 13. Therefore, a user can ascertain an accurate position of the object such as a person or a car.

The time interval which has been estimated by the time interval estimation section 12 includes the third delay time from when detection of the object by the detection section 11 is ended to when the superimposition video generation section 14 carries out superimposition of the object. Therefore, the first position correction section 13 can correct the object position so that a deviation in position of the detected object is further reduced.

The time interval estimated by the time interval estimation section 12 includes the fourth delay time from when the second video is taken to when the second video is acquired. Therefore, the first position correction section 13 can correct the object position so that a deviation in position of the detected object is further reduced.

Third Example Embodiment

Figure 8:
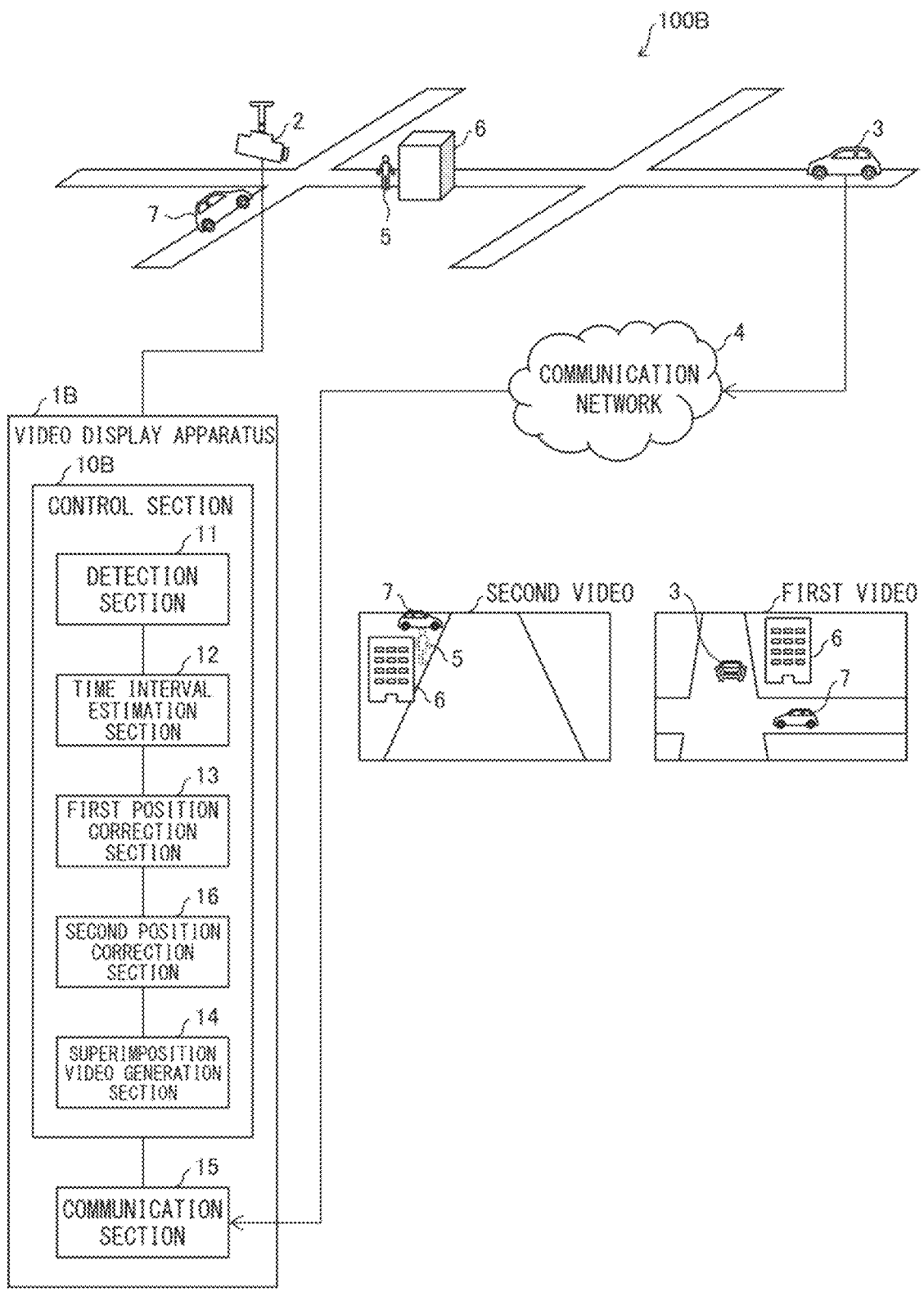
FIG. 8 is a block diagram illustrating a functional configuration of a video display system in accordance with a third example embodiment of the present invention.

The following description will discuss in detail a third example embodiment of the present invention, with reference to the drawings. FIG. 8 is a block diagram illustrating a functional configuration of a video display system 100B. A video display apparatus 1B in accordance with the present example embodiment is provided in, for example, a control center or the like. A camera 2 that takes a first video is provided in, for example, a traffic light. An in-vehicle camera that takes a second video is mounted on, for example, a vehicle 3. The in-vehicle camera is an example of the imaging apparatus that takes a second video.

<Configuration of Video Display System 100B>

The following description will discuss a configuration of the video display system 100B in accordance with the present example embodiment, with reference to FIG. 8. As illustrated in FIG. 8, the video display system 100B includes the video display apparatus 1B, the camera 2 that takes a first video, and the in-vehicle camera that is mounted on the vehicle 3 and takes a second video.

The video display apparatus 1B includes a control section 10B and a communication section 15. The control section 10B includes a detection section 11, a time interval estimation section 12, a first position correction section 13, a superimposition video generation section 14, and a second position correction section 16. The same reference numerals are given to constituent elements which have functions identical with those described in the third example embodiment, and descriptions as to such constituent elements are omitted as appropriate. The second position correction section 16 is configured to implement the second position correction means in the present example embodiment.

In a case where an object is a moving object, the second position correction section 16 corrects, based on a moving speed of the object and a time interval which has been estimated by the time interval estimation section 12, a position of the object in a second video, in addition to correction of a position of the object by the first position correction section 13.

For example, in a case where an object which has been detected by the detection section 11 is superimposed or superimposed and displayed on a second video taken at a timing T1 in FIG. 5, a moving distance of the object is as indicated in an expression (expression 3) below. As such, the second position correction section 16 corrects, in accordance with the moving distance of the object, a position of the object which has been detected by the detection section 11. Hereinafter, the moving object will be described as a second vehicle 7 illustrated in FIG. 8. Note, however, that the moving object may be a pedestrian, a bicycle, or the like.

$$\text{Moving distance of second vehicle 7} = \quad \text{(expression 3)}$$
$$(DL1 + DL2 + DL3 - DL4 - DL5) \times$$
$$(\text{moving speed of second vehicle})$$

The moving speed of the second vehicle 7 can be acquired, for example, by using a V2X communication technique. The moving speed of the second vehicle 7 can be calculated based on a position of the second vehicle 7 in a first video taken by the camera 2. For example, the detection section 11 extracts a position of the second vehicle 7 in a certain frame of the first video, and then extracts a position of the second vehicle 7 in a next frame. Then, the detection section 11 can calculate the moving speed of the second vehicle 7 based on a difference (moving distance) of the second vehicle 7 between the two frames and a frame frequency of the first video.

In the above descriptions, the case has been described in which the superimposition video generation section is provided in the control center. Note, however, that it is possible to employ a configuration in which the in-vehicle camera mounted on the vehicle 3 includes the superimposition video generation section, and an object is superimposed on a second video on the in-vehicle camera side. In this case, the video display apparatus 1B transmits position information and the like of the object which has been corrected by the first position correction section 13 and the second position correction section 16 to the in-vehicle camera via the communication network 4. The superimposition video generation section of the in-vehicle camera superimposes the corrected image of the object received from the video display apparatus 1B on a second video that has been taken by the in-vehicle camera. As illustrated in FIG. 5, the in-vehicle camera superimposes the object on the second video at a timing T2. Therefore, the moving distance of the second vehicle 7 is as indicated in an expression (expression 4) below.

$$\text{Moving distance of second vehicle} = \quad \text{(expression 4)}$$
$$(DL1 + DL2 + DL3) \times (\text{moving speed of second vehicle})$$

The second position correction section 16 further corrects, in accordance with the moving distance of the second vehicle 7 which has been calculated using (expression 3) or (expression 4), the position of the object which has been detected by the detection section 11.

Figure 9:
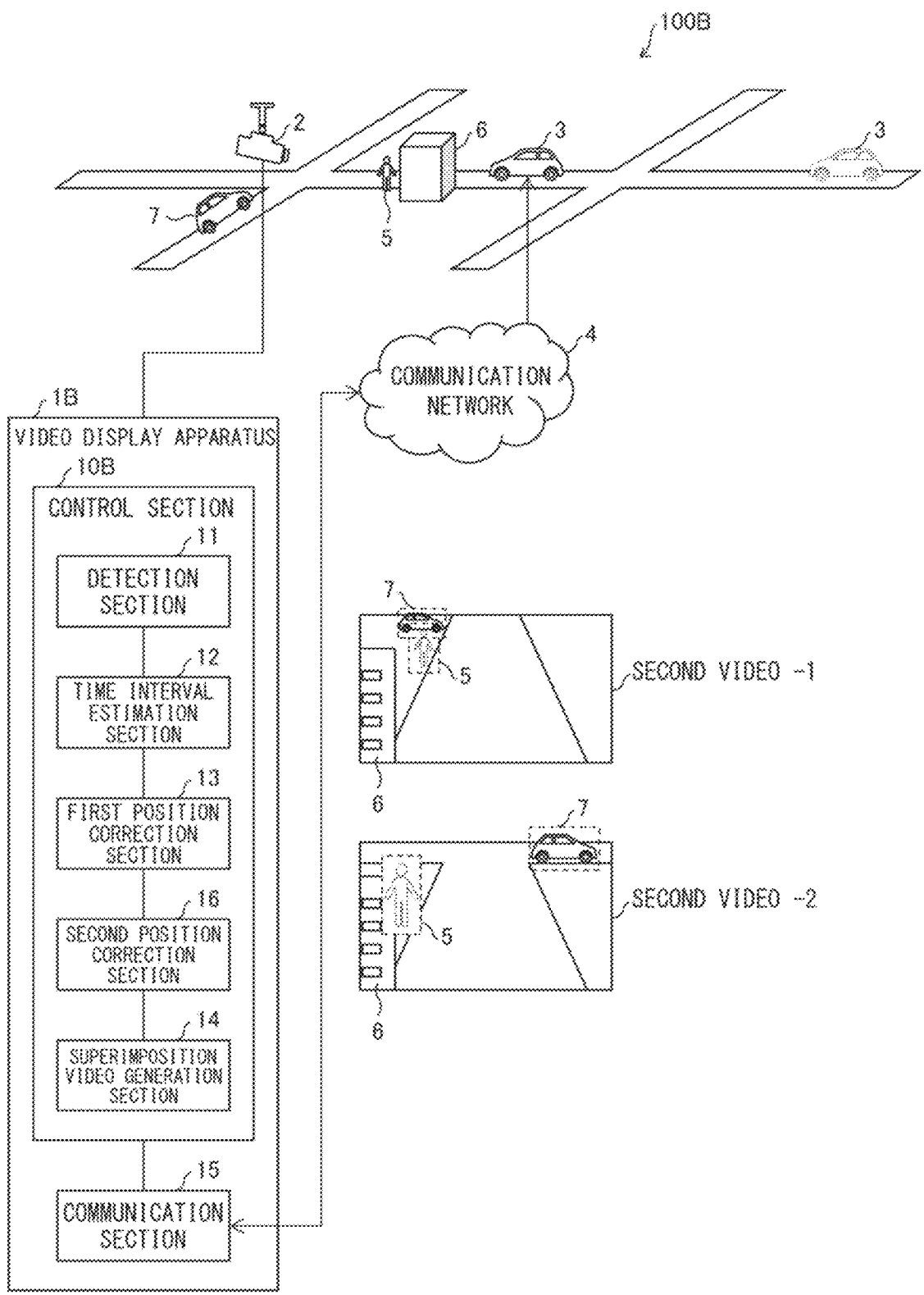
FIG. 9 is a diagram for describing a second video in a case where a time interval estimated by the time interval estimation section is taken into consideration.

FIG. 9 is a diagram for describing a second video in a case where a time interval estimated by the time interval estimation section 12 is taken into consideration. It is assumed that the vehicle 3 has moved from a position indicated by dotted lines to a position indicated by solid lines during the time interval which has been estimated by the time interval estimation section 12.

A second video −1 indicates a case in which the time interval which has been estimated by the time interval estimation section 12 is not taken into consideration. A second video −2 indicates a case in which the time interval which has been estimated by the time interval estimation section 12 is taken into consideration. The vehicle 3 approaches the passer-by 5 by the moving distance of the vehicle 3. Therefore, as indicated in the second video −2, the first position correction section 13 carries out correction such that the positions of the passer-by 5 and the second vehicle 7 in the second video approach the vehicle 3, and carries out correction such that the passer-by 5 and the second vehicle 7 become larger accordingly.

The second position correction section 16 corrects a position of the second vehicle 7 only by the moving distance of the second vehicle 7, as indicated in the second video −2. In FIG. 9, the passer-by 5 and the second vehicle 7 displayed are surrounded with dotted lines so that the passer-by 5 and the second vehicle 7 stand out. Alternatively, for example, the passer-by 5 and the second vehicle 7 displayed may be highlighted.

Figure 10:
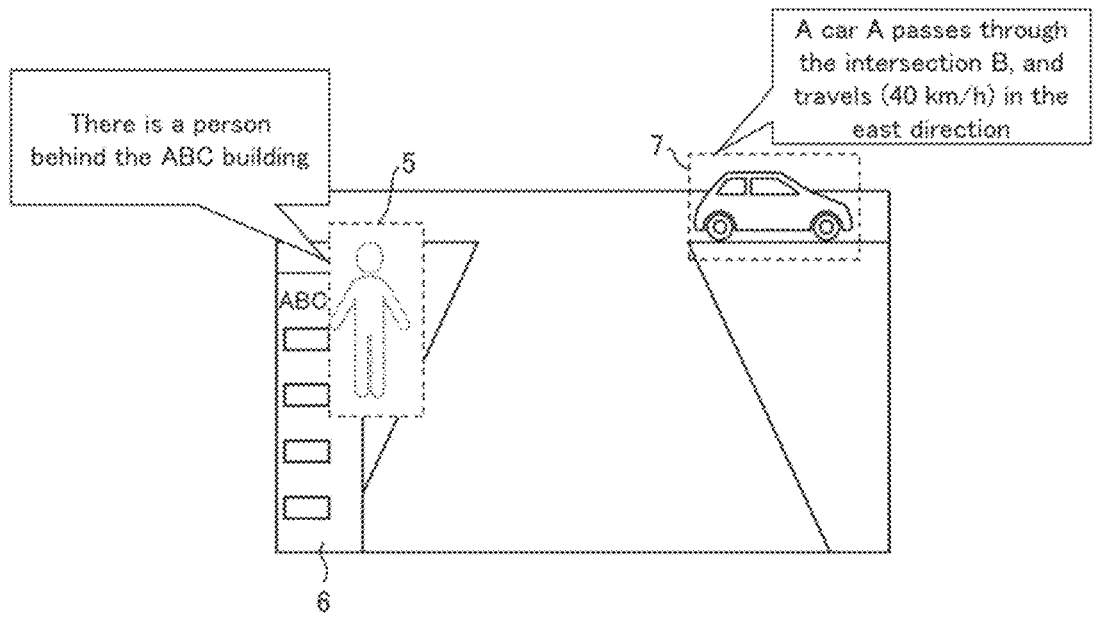
FIG. 10 is a diagram illustrating an example case in which an object whose position has been corrected is superimposed and displayed on a second video.

FIG. 10 is a diagram illustrating an example case in which an object whose position has been corrected is superimposed and displayed on a second video. In a case where the object is hidden by another object in the second video, the superimposition video generation section 14 superimposes the object on the second video in a mode in which the object is recognizable.

For example, the detection section 11 carries out object detection from a first video that has been taken by the camera 2, and detects a passer-by 5 and a building 6. Then, the detection section 11 determines whether or not the passer-by 5 overlaps the building 6 based on position information of the passer-by 5 and position information of the building 6. Thus, it is possible to determine whether or not the passer-by 5 is hidden by the building 6 in the second video. Note that this operation is not essential, and it is possible to superimpose an image of the passer-by 5 regardless of whether or not the passer-by 5 overlaps the building 6.

In FIG. 10, the passer-by 5 is hidden by the building 6. Therefore, the superimposition video generation section 14 superimposes and displays the passer-by 5 in a recognizable mode, for example, superimposes and displays the passer-by 5 with dotted lines on the building 6, and displays a message "There is a person behind the ABC building".

In addition, in FIG. 10, the second vehicle 7 crosses an intersection. Therefore, the superimposition video generation section 14 displays the second vehicle 7 in a recognizable mode, for example, displays the second vehicle 7 with surrounding dotted lines, and displays a message "A car A passes through the intersection B, and travels (40 km/h) in the east direction".

<Flow of Video Display Method Carried Out by Video Display System 100B>

Figure 11:
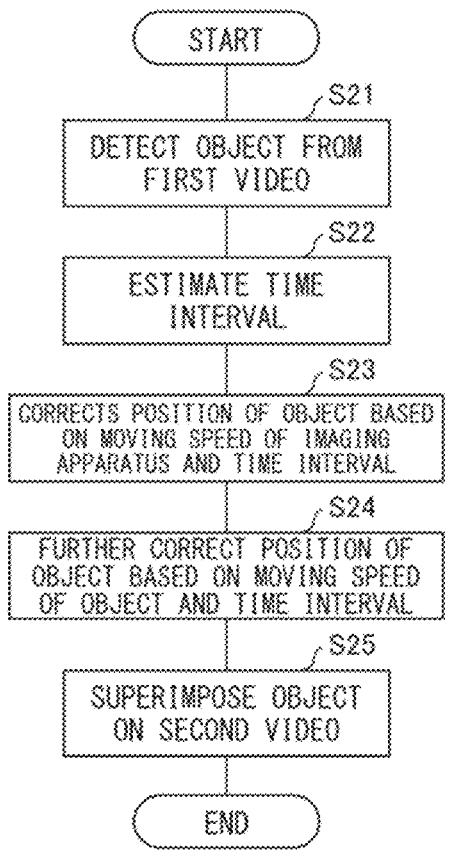
FIG. 11 is a flowchart illustrating a flow of a video display method in accordance with the third example embodiment of the present invention.

The following description will discuss a flow of a video display method which is carried out by the video display system 100B configured as described above, with reference to FIG. 11. FIG. 11 is a flowchart illustrating the flow of the video display method. As illustrated in FIG. 11, the video display method includes steps S21 through S25.

First, the detection section 11 detects an object from a first video (S21). Then, the time interval estimation section 12 estimates a time interval from when the first video is taken to when the object which has been detected is superimposed on a second video (S22).

The first position correction section 13 corrects a position of the object in the second video based on a moving speed of an imaging apparatus that takes the second video and the time interval (S23). Then, the second position correction section 16 further corrects the position of the object in the second video based on the moving speed of the object and the estimated time interval (S24). Lastly, the superimposition video generation section 14 superimposes, on the second video, the object whose position has been corrected (S25).

Example Advantage of Video Display System 100B

As described above, according to the video display system 100B in accordance with the present example embodiment, the second position correction section 16 further corrects the position of the object in the second video based on the moving speed of the object and the estimated time interval. Therefore, it is possible to correct the object position so that a deviation in position of the detected object is further reduced.

Fourth Example Embodiment

Figure 12:
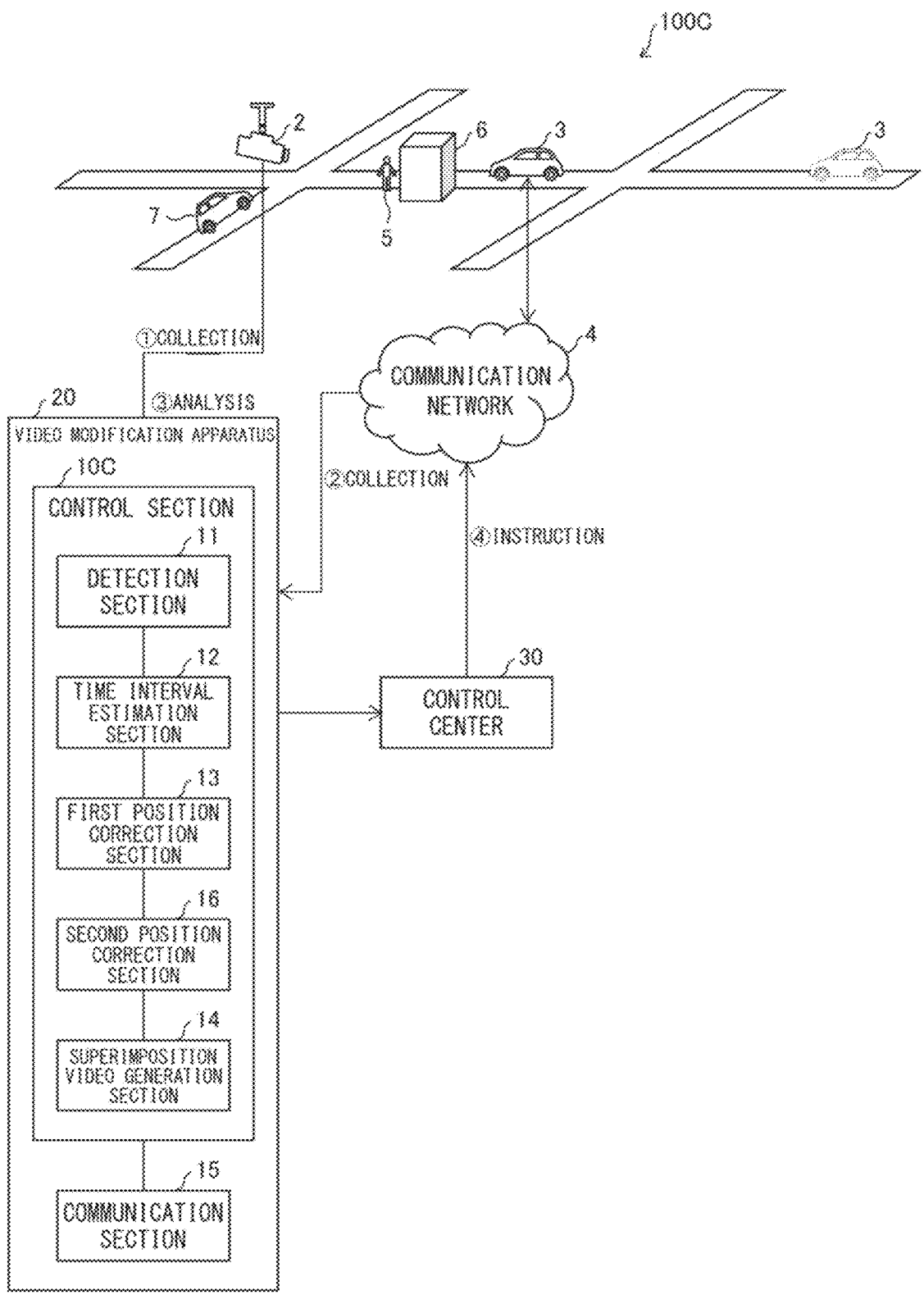
FIG. 12 is a block diagram illustrating a functional configuration of a video display system in accordance with a fourth example embodiment of the present invention.

The following description will discuss a fourth example embodiment of the present invention in detail with reference to the drawings. FIG. 12 is a block diagram illustrating a functional configuration of a video display system 100C. A video modification apparatus 20 in accordance with the present example embodiment is provided in, for example, a place other than a control center. A camera 2 that takes a first video is provided in, for example, a traffic light. An in-vehicle camera that takes a second video is mounted on, for example, a vehicle 3. The in-vehicle camera is an example of the imaging apparatus that takes a second video.

<Configuration of Video Display System 100A>

The following description will discuss a configuration of the video display system 100C in accordance with the present example embodiment, with reference to FIG. 12. As illustrated in FIG. 12, the video display system 100C includes the video modification apparatus 20, the camera 2 that takes a first video, and the in-vehicle camera that is mounted on the vehicle 3 and takes a second video.

The video modification apparatus 20 includes a control section 10C and a communication section 15. The control section 10C includes a detection section 11, a time interval estimation section 12, a first position correction section 13, a superimposition video generation section 14, and a second position correction section 16. The same reference numerals are given to constituent elements which have functions identical with those described in the first through fourth example embodiments, and descriptions as to such constituent elements are omitted as appropriate.

The detection section 11 detects an object from a first video collected from the camera 2 via the communication section 15. The time interval estimation section 12 estimates a time interval from when the first video is taken to when the object which has been detected by the detection section 11 is superimposed on a second video.

The first position correction section 13 collects a moving speed of the vehicle 3 from the vehicle 3 via the communication section 15, and analyzes and corrects a position of the object in the second video based on a moving speed of an in-vehicle camera that takes a second video and the time interval which has been estimated by the time interval estimation section 12. The second position correction section 16 further corrects the position of the object in the second video based on the moving speed of the object and the time interval which has been estimated by the time interval estimation section 12.

The superimposition video generation section 14 superimposes, on the second video, the object whose position has been corrected. Then, the superimposition video generation section 14 transmits the superimposition video to a control center 30 via the communication section 15. The control center 30 analyzes the superimposition video received from the video modification apparatus 20. The control center 30 then transmits an instruction (such as information regarding situations and safety around the vehicle 3) to the vehicle 3 via a communication network 4. The analysis of the superimposition video may be carried out by a person such as an operator who carries out remote monitoring, or may be carried out by AI such as a collision detection system.

Example Advantage of Video Display System 100C

As described above, according to the video display system 100C in accordance with the present example embodiment, the video modification apparatus 20 superimposes, on the second video, the object whose position has been corrected, and transmits the superimposition video to the control center 30. Therefore, the control center 30 can carry out analysis of the superimposition video and the like, and transmit an instruction to the vehicle 3.

Software Implementation Example

The functions of part of or all of the video display apparatuses 1, 1A, and 1B and the video modification apparatus 20 can be implemented by hardware such as an integrated circuit (IC chip) or can be alternatively implemented by software.

Figure 13:
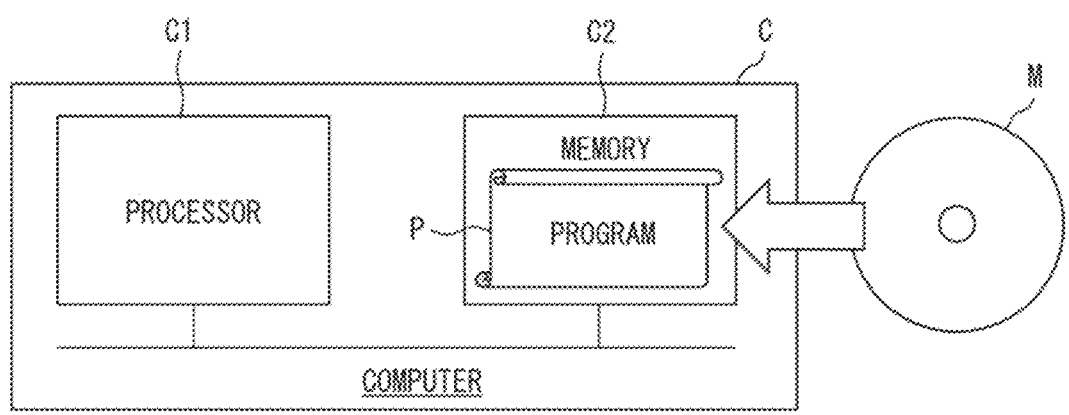
FIG. 13 is a diagram illustrating an example of hardware of a computer.

In the latter case, the video display apparatuses 1, 1A, and 1B and the video modification apparatus 20 are each implemented by, for example, a computer that executes instructions of a program that is software implementing the foregoing functions. FIG. 13 illustrates an example of such a computer (hereinafter, referred to as "computer C"). The computer C includes at least one processor C1 and at least one memory C2. The memory C2 stores a program P for causing the computer C to function as the video display apparatuses 1, 1A, and 1B and the video modification apparatus 20. In the computer C, the processor C1 reads the program P from the memory C2 and executes the program P, so that the functions of the video display apparatuses 1, 1A, and 1B and the video modification apparatus 20 are implemented.

Examples of the processor C1 include a central processing unit (CPU), a graphic processing unit (GPU), a digital signal processor (DSP), a micro processing unit (MPU), a floating point number processing unit (FPU), a physics processing unit (PPU), a microcontroller, and a combination thereof. Examples of the memory C2 include a flash memory, a hard disk drive (HDD), a solid state drive (SSD), and a combination thereof.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a computer C-readable, non-transitory, and tangible storage medium M. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communication network, a broadcast wave, or the like. The computer C can obtain the program P also via such a transmission medium.

The example embodiments described above may be carried out alone, or may be carried out as a combination of a plurality of example embodiments.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

Some or all of the foregoing example embodiments can also be described as below. Note, however, that the present invention is not limited to the following supplementary notes.

(Supplementary Note 1)

A video display system, including: a detection means for detecting an object from a first video; a time interval estimation means for estimating a time interval from when the first video is taken to when the object which has been detected by the detection means is superimposed on a second video; and a first position correction means for correcting a position of the object in the second video based on a moving speed of an imaging apparatus that takes the second video and the time interval which has been estimated by the time interval estimation means.

According to the above configuration, it is possible to correct an object position so that a deviation in position of a detected object is reduced.

(Supplementary Note 2)

The video display system according to supplementary note 1, in which: the time interval includes a first delay time from when the first video is taken to when the first video is acquired by the detection means.

According to the above configuration, it is possible to correct an object position so that a deviation in position of a detected object is further reduced.

(Supplementary Note 3)

The video display system according to supplementary note 1 or 2, in which: the time interval includes a second delay time that is taken for the detection means to detect the object.

According to the above configuration, it is possible to correct an object position so that a deviation in position of a detected object is further reduced.

(Supplementary Note 4)

The video display system according to any one of supplementary notes 1 through 3, further including: a superimposition video generation means for superimposing, on the second video, the object whose position has been corrected by the first position correction means.

According to the above configuration, a user can ascertain an accurate position of an object such as a passer-by or a car.

(Supplementary Note 5)

The video display system according to supplementary note 4, in which: in a case where the object is hidden by another object in the second video, the superimposition video generation means superimposes the object on the second video in a mode in which the object is recognizable.

According to the above configuration, a user can ascertain an accurate position of an object such as a passer-by or a car.

(Supplementary Note 6)

The video display system according to supplementary note 4 or 5, in which: the time interval includes a third delay time from when detection of the object by the detection means is ended to when the superimposition video generation means carries out superimposition of the object.

According to the above configuration, it is possible to correct an object position so that a deviation in position of a detected object is further reduced.

(Supplementary Note 7)

The video display system according to any one of supplementary notes 1 through 6, further including: a second position correction means for further correcting the position of the object in the second video based on a moving speed of the object and the time interval which has been estimated by the time interval estimation means.

According to the above configuration, it is possible to correct an object position so that a deviation in position of a detected object is further reduced.

(Supplementary Note 8)

A video display method, including: detecting an object from a first video; estimating a time interval from when the first video is taken to when the object which has been detected is superimposed on a second video; and correcting a position of the object in the second video based on a moving speed of an imaging apparatus that takes the second video and the time interval.

According to the above configuration, it is possible to correct an object position so that a deviation in position of a detected object is reduced.

(Supplementary Note 9)

The video display method according to supplementary note 8, in which: the time interval includes a first delay time from when the first video is taken to when the first video is acquired.

According to the above configuration, it is possible to correct an object position so that a deviation in position of a detected object is further reduced.

(Supplementary Note 10)

The video display method according to supplementary note 8 or 9, in which: the time interval includes a second delay time that is taken for the detecting of the object.

According to the above configuration, it is possible to correct an object position so that a deviation in position of a detected object is further reduced.

(Supplementary Note 11)

The video display method according to any one of supplementary notes 8 through 10, further including: superimposing, on the second video, the object whose position has been corrected.

According to the above configuration, a user can ascertain an accurate position of an object such as a passer-by or a car.

(Supplementary Note 12)

The video display method according to supplementary note 11, in which: in a case where the object is hidden by another object in the second video, in the superimposing of the object, the object is superimposed on the second video in a mode in which the object is recognizable.

According to the above configuration, a user can ascertain an accurate position of an object such as a passer-by or a car.

(Supplementary Note 13)

The video display method according to supplementary note 11 or 12, in which: the time interval includes a third delay time from when detection of the object is ended to when superimposition of the object is carried out.

According to the above configuration, it is possible to correct an object position so that a deviation in position of a detected object is further reduced.

(Supplementary Note 14)

The video display method according to any one of supplementary notes 8 through 13, further including: further correcting the position of the object in the second video based on a moving speed of the object and the time interval which has been estimated.

According to the above configuration, it is possible to correct an object position so that a deviation in position of a detected object is further reduced.

(Supplementary Note 15)

A video display apparatus, including: a detection means for detecting an object from a first video; a time interval estimation means for estimating a time interval from when the first video is taken to when the object which has been detected by the detection means is superimposed on a second video; and a first position correction means for correcting a position of the object in the second video based on a moving speed of an imaging apparatus that takes the second video and the time interval which has been estimated by the time interval estimation means.

According to the above configuration, it is possible to correct an object position so that a deviation in position of a detected object is reduced.

(Supplementary Note 16)

The video display apparatus according to supplementary note 15, in which: the time interval includes a first delay time from when the first video is taken to when the first video is acquired by the detection means.

According to the above configuration, it is possible to correct an object position so that a deviation in position of a detected object is further reduced.

(Supplementary Note 17)

The video display apparatus according to supplementary note 15 or 16, in which: the time interval includes a second delay time that is taken for the detection means to detect the object.

According to the above configuration, it is possible to correct an object position so that a deviation in position of a detected object is further reduced.

(Supplementary Note 18)

The video display apparatus according to any one of supplementary notes 15 through 17, further including: a superimposition video generation means for superimposing, on the second video, the object whose position has been corrected by the first position correction means.

According to the above configuration, a user can ascertain an accurate position of an object such as a passer-by or a car.

(Supplementary Note 19)

The video display apparatus according to supplementary note 17 or 18, in which: the time interval includes a third delay time from when detection of the object by the detection means is ended to when the superimposition video generation means carries out superimposition of the object.

According to the above configuration, it is possible to correct an object position so that a deviation in position of a detected object is further reduced.

(Supplementary Note 20)

The video display apparatus according to any one of supplementary notes 15 through 19, further including: a second position correction means for further correcting the position of the object in the second video based on a moving speed of the object and the time interval which has been estimated by the time interval estimation means.

According to the above configuration, it is possible to correct an object position so that a deviation in position of a detected object is further reduced.

(Supplementary Note 21)

A video display system including at least one processor, the at least one processor carrying out: a process of detecting an object from a first video; a process of estimating a time interval from when the first video is taken to when the object which has been detected is superimposed on a second video; and a process of correcting a position of the object in the second video based on a moving speed of an imaging apparatus that takes the second video and the time interval.

Note that the video display system can further include a memory. The memory can store a program for causing the at least one processor to carry out the detection process, the estimation process, and the correction process. The program can be stored in a computer-readable non-transitory tangible storage medium.

(Supplementary Note 22)

A video display apparatus including at least one processor, the at least one processor carrying out: a process of detecting an object from a first video; a process of estimating a time interval from when the first video is taken to when the object which has been detected is superimposed on a second video; and a process of correcting a position of the object in the second video based on a moving speed of an imaging apparatus that takes the second video and the time interval.

Note that the video display apparatus can further include a memory. The memory can store a program for causing the at least one processor to carry out the detection process, the estimation process, and the correction process. The program can be stored in a computer-readable non-transitory tangible storage medium.

REFERENCE SIGNS LIST 1, 1A, 1B: Video display apparatus
2: Camera
3: Vehicle
4: Communication network
10, 10B, 10C: Control section
11: Detection section
12: Time interval estimation section
13: First position correction section
14: Superimposition video generation section
15: Communication section
16: Second position correction section
20: Video correction apparatus
10 30: Control center
100, 100A, 100B, 100C: Video display system

What is claimed is:

1. A video display system, comprising at least one processor, the at least one processor carrying out:
   a process of detecting an object from a first video;
   a process of estimating a time interval from when the first video is taken to when the object which has been detected is superimposed on a second video; and
   a process of correcting a position of the object in the second video based on a moving speed of an imaging apparatus that takes the second video and the time interval which has been estimated.

2. The video display system according to claim 1, wherein:
   the time interval includes a first delay time from when the first video is taken to when the first video is acquired.

3. The video display system according to claim 1, wherein:
   the time interval includes a second delay time that is taken to detect the object.

4. The video display system according to claim 1, wherein:
   the at least one processor further carries out a process of superimposing, on the second video, the object whose position has been corrected.

5. The video display system according to claim 4, wherein:
   in a case where the object is hidden by another object in the second video, the at least one processor superimposes the object on the second video in a mode in which the object is recognizable.

6. The video display system according to claim 4, wherein:
   the time interval includes a third delay time from when detection of the object is ended to when superimposition of the object is carried out.

7. The video display system according to claim 1, wherein:
   the at least one processor further carries out a process of further correcting the position of the object in the second video based on a moving speed of the object and the time interval which has been estimated.

8. A video display method, comprising:
   detecting an object from a first video;
   estimating a time interval from when the first video is taken to when the object which has been detected is superimposed on a second video; and
   correcting a position of the object in the second video based on a moving speed of an imaging apparatus that takes the second video and the time interval.

9. The video display method according to claim 8, wherein:
   the time interval includes a first delay time from when the first video is taken to when the first video is acquired.

10. The video display method according to claim 8, wherein:
    the time interval includes a second delay time that is taken for the detecting of the object.

11. The video display method according to claim 8, further comprising:
    superimposing, on the second video, the object whose position has been corrected.

12. The video display method according to claim 11, wherein:
    in a case where the object is hidden by another object in the second video, in the superimposing of the object, the object is superimposed on the second video in a mode in which the object is recognizable.

13. The video display method according to claim 11, wherein:
the time interval includes a third delay time from when detection of the object is ended to when superimposition of the object is carried out.

14. The video display method according to claim 8, further comprising:
further correcting the position of the object in the second video based on a moving speed of the object and the time interval which has been estimated.

15. A video display apparatus, comprising at least one processor, the at least one processor carrying out:
a process of detecting an object from a first video;
a process of estimating a time interval from when the first video is taken to when the object which has been detected is superimposed on a second video; and
a process of correcting a position of the object in the second video based on a moving speed of an imaging apparatus that takes the second video and the time interval which has been estimated.

16. The video display apparatus according to claim 15, wherein:
the time interval includes a first delay time from when the first video is taken to when the first video is acquired.

17. The video display apparatus according to claim 15, wherein:
the time interval includes a second delay time that is taken to detect the object.

18. The video display apparatus according to claim 15, wherein:
the at least one processor further carries out a process of superimposing, on the second video, the object whose position has been corrected.

19. The video display apparatus according to claim 18, wherein:
the time interval includes a third delay time from when detection of the object is ended to when superimposition of the object is carried out.

20. The video display apparatus according to claim 15, wherein:
the at least one processor further carries out a process of further correcting the position of the object in the second video based on a moving speed of the object and the time interval which has been estimated.

* * * * *